April 29, 1958
F. M. RAPP
2,832,864
VEHICLE SAFETY DEVICE
Filed April 18, 1955
2 Sheets-Sheet 1
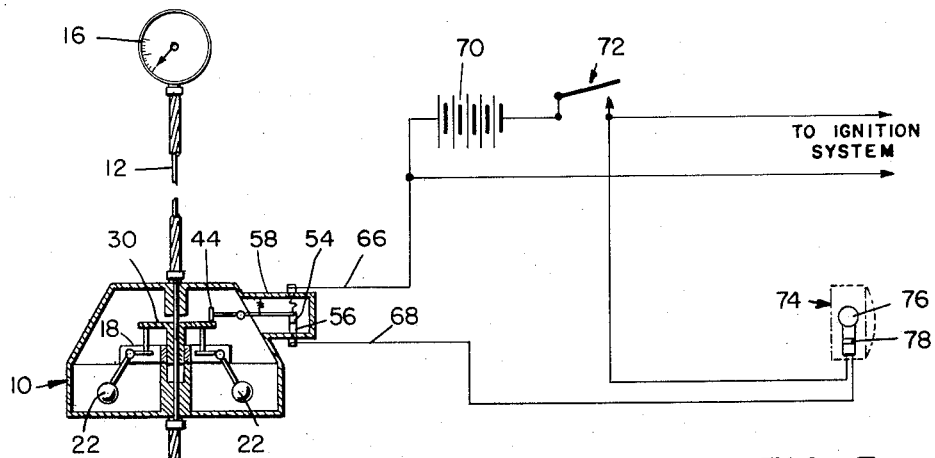
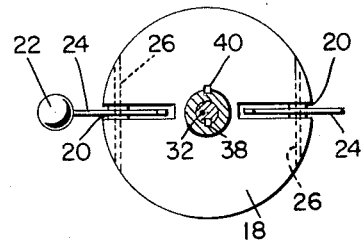
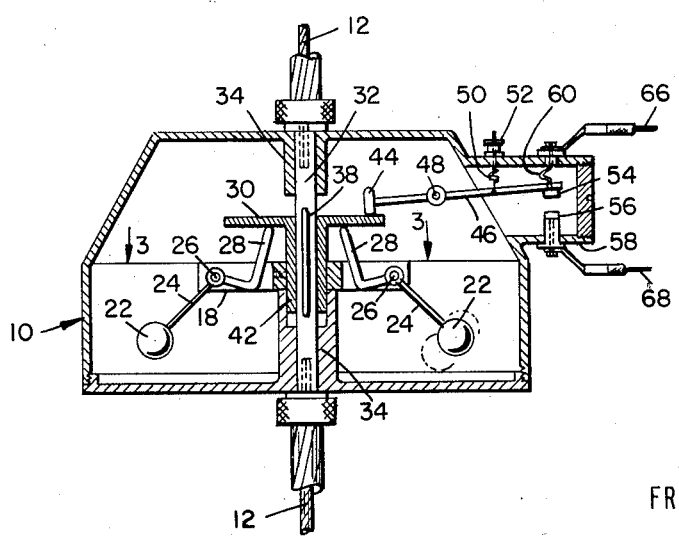
INVENTOR
FRANCIS M. RAPP
BY
ATTORNEY April 29, 1958  F. M. RAPP  2,832,864
VEHICLE SAFETY DEVICE Filed April 18, 1955  2 Sheets-Sheet 2

INVENTOR
FRANCIS M. RAPP
BY
*Albert J Fihe*
ATTORNEY

United States Patent Office 2,832,864
Patented Apr. 29, 1958

2,832,864

VEHICLE SAFETY DEVICE

Francis M. Rapp, San Fernando, Calif.

Application April 18, 1955, Serial No. 501,801

2 Claims. (Cl. 200—80)

This invention relates to an improved vehicle safety device and has for one of its principal objects the provision of means whereby motorists and others operating on highways, streets or the like will be automatically warned when the vehicle ahead has slowed down to such a degree that overtaking the same at a relatively high speed may be dangerous.

One of the important objects of the invention is to provide a warning device which can be installed on the rear end of a truck, bus or other vehicle, and the operating means for which is connected to the speedometer of such vehicle in such fashion that when the vehicle, because of a steep hill or other reason, slows down to a speed where it becomes a menace to fast approaching vehicles from the rear, a set of signal lights will be actuated.

A further object of the invention is the provision of a completely automatic safety device for trucks and other cumbersome vehicles which will be operated upon the slowing down of such vehicle and which will preferably continue to flash lights on and off, making the same more noticeable, even in the daytime, and wherein this condition will remain effective until the truck or other vehicle again attains normal speed.

Still another object of the invention is to provide an automatic vehicle safety device for trucks or the like which is so connected to the ignition system of the engine of the vehicle that the same will operate even when the vehicle is stopped for any reason, and this also applies in cases where the engine is disabled.

Yet another object of the invention is to provide a device of the class described which is most conveniently and efficiently installed between the speedometer and transmission of such a motor vehicle, and which therefore will be independent of the engine speed and will operate solely in relation to the speed of the vehicle.

Another and still further important object of the invention is the provision of such a safety control device which, with little or no change, can be employed as a governor, whereby an upper speed limit of the vehicle upon which it is installed may be accurately set.

Other and further important objects of the invention will be apparent from the disclosures in the accompanying drawings and following specification.

The invention, in a preferred form, is illustrated in the drawings and hereinafter more fully described.

In the drawings:

Figure 1 is a sectional view of a preferred embodiment of the vehicle safety device of this invention, illustrating the same as installed between the transmission and speedometer of a vehicle such as a truck, bus or the like, and the figure includes a wiring diagram.

Figure 2 is an enlarged view of the main portion of the apparatus shown in Figure 1.

Figure 3 is a horizontal section taken on the line 3—3 of Figure 2, looking in the direction indicated by the arrows.

As shown in the drawings:

Figure 4:
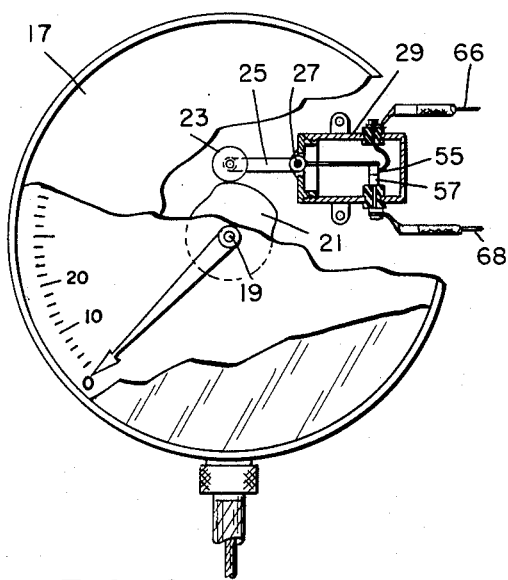
Figure 4 represents a modified form of the invention, wherein the control element is conected directly to the speedometer.
Figure 5:
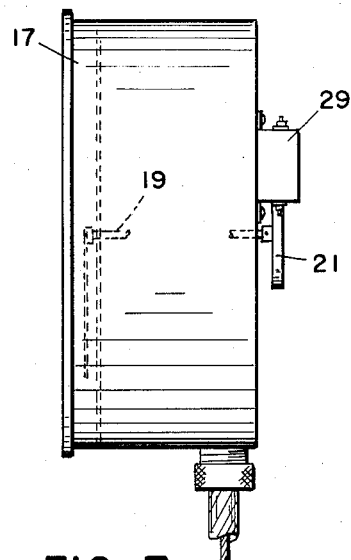
Figure 5 is a side view of the mechanism of Figure 4, parts being omitted and other parts being shown in dotted lines.

The reference numeral 10 indicates generally the casing of the preferred control apparatus of the vehicle safety device of this invention. In this embodiment, the same is installed directly upon the shaft 12 which leads from the transmission 14 of the vehicle to the speedometer 16. The housing 10 is fixed to some convenient part of the chassis of the truck or other vehicle and that portion of the speedometer shaft 12 which passes therethrough has keyed or otherwise fastened thereon a disc 18, as best shown in Figures 2 and 3.

This disc is provided with diametrically opposed slots 20 and in each of the slots, a governer weight 22 is pivoted by means of a bell crank or arm 24, the connection to the disc being made by means of pins 26.

Each of the bell cranks 24 has an upper extension 28 (Figure 2) and these ride against the under-face of a second plate or disc 30. Both the discs 18 and 30 are keyed to a shaft 32 which is mounted in suitable bearings 34 in the case 10, and which shaft is coupled at each end to the speedometer shaft 12 in any conventional manner. The disc 18 is fixed to rotate with the shaft 32 by means of a key 38 (Figure 3) and the disc 30 is slidably mounted on the shaft 32 but normally rotates therewith, this being accomplished by means of a key 40, which, however, allows of a free up and down movement of the disc 30 with respect to its supporting shaft 32. This is assured by a sleeve 42 which is integral with the disc 30 and slidably surmounts the shaft 32.

Adapted to ride on the upper face of the disc 30 is a roller 44 mounted on the end of a rod or lever 46 which is pivoted at 48 to a convenient support in the casing 10. This rod 46 is normally held in uppermost position, as best shown in Figure 2, by means of a spring 50 which has an adjustment 52.

An electrical contact switch 54 is on the other end of the lever 46 and this, when depresssed, will strike a corresponding contact point 56 fitted in an extension 58 of the casing 10. A flexible wire 60 leads from the contact 54 to a current carrying wire 66, and the contact 56 is connected to a corresponding current carrying wire 68.

The wire 66 leads to the battery 70 of the automotive vehicle and through the ignition switch 72 to the ignition system. The wire 68 leads to a warning light unit or units 74 which usually comprise bulbs 76 and flasher units 78. These are mounted on the rear of the truck or other vehicle so as to be readily visible by drivers of cars approaching from the rear whenever the same are actuated.

In operation, and whenever the ignition switch of the vehicle 72 is in current carrying position, and also whether the vehicle is in very slow motion or at rest, the centrifugal governor balls 22 will be in their lowermost position, thereby elevating the discs 30 and the roller 44. This will cause a depression of the contact point 54 at the outer end of the lever 46, thereby operating the warning light units 74 at the rear of the vehicle. As the vehicle picks up speed above a certain predetermined miles per hour, the governor balls 22 will move outwardly and upwardly, whereupon gravity will cause a downward movement of the rotating disc 30 with its contacting roller 44 separating the current carrying points and opening the current flow to the warning unit 74. This predetermined speed is such that the truck or other vehicle equipped with this unit ceases to be a menace to traffic and the same can be adjusted to meet various and varying road conditions. For example, the danger speed may, in some localities, be five miles per hour, while in others it may be twenty.

In Figure 4, a slightly modified form of the invention is illustrated, wherein a speedometer 17 has its indicator shaft 19 fitted with a cam 21. This cam contacts a roller 23 and has a high point corresponding with its low speed movement over the dial. The roller 23 is mounted on a rod 25 pivoted at 27 in a housing 29 on the casing of the speedometer 17, and this rod has a contact point 55 co-operating with another contact point 57 which in turn are connected respectively to the wires 66 and 68 leading to the battery, ignition system and warning light unit previously described and shown in connection with Figure 1.

Figure 6:
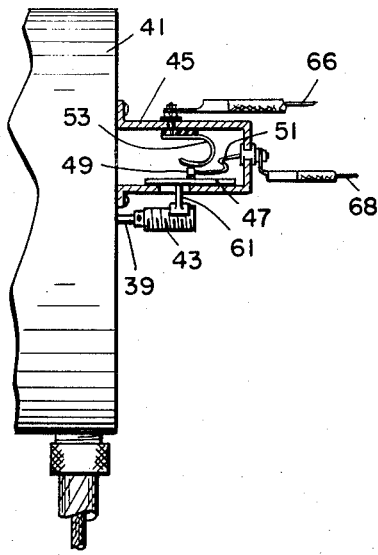
Figure 6 illustrates a still further modification of the device, and here again the same may be attached directly to the speedometer.

Another modified form of the invention is illustrated in Figure 6, wherein the pointer shaft 39 of the speedometer 41 protrudes through the rear face of its casing and has an externally screw-threaded sleeve 43 fixed thereon.

An auxiliary housing 45 is fastened to the rear face of the speedometer casing 41 and this contains a slider type electrical contact point carrying element 47. Such a current carrying point 49 is mounted on the slider 47 and a flexible wire 51 connects this point to the wire 68 leading to the warning light unit.

A U-shaped flexible current carrying spring element 53 is fixed inside the casing 45 in position to be contacted by the slidable current carrying contact point 49, when the same is carried rearwardly by the retrograde movement of the speedometer pointer owing to the slowing down of the vehicle. The slider 47 is fitted with an extension 61 projecting through an opening in the bottom of the case 45 with its outer end riding on the screw-threaded element 43. Whenever the vehicle speed drops below a certain predetermined point, the speedometer shaft 39 will accordingly rotate the screw-threaded element 43, causing a rearward movement of the slider 47 with its projection 61 and making a current carrying contact for the warning light unit.

Figure 7:
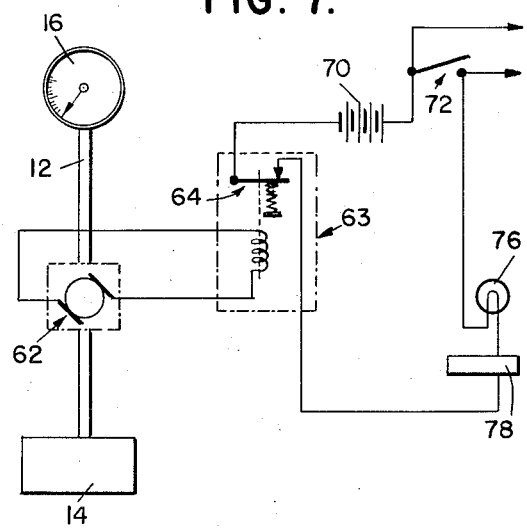
Figure 7 represents a still further modification of the invention, wherein an electric generator can be installed on the transmission or speedometer shaft, and this in turn delivers current for the warning lights.

A still further modification of the invention resides in incorporating a small electric generator into or on to the speedometer shaft 12, which generator and its relationship to the other elements is shown in Figure 7, the generator being indicated by the reference numeral 62. Whenever the vehicle is proceeding at a rate of speed above a predetermined minimum, the generator 62 will cause sufficient current flow through a relay 63 so as to open a contact or switch 64, which is in the circuit to the ignition switch 72, warning light units 76 and 78 and through the battery 70. However, when the vehicle speed drops below the danger point, a spring in the relay 63 will close the contact switch 64, moving the same into the position shown in Figure 7, when the warning lights will be actuated.

The apparatus, with relatively small changes, may be adapted to govern the maximum speed of a vehicle so as to prevent accidents resulting from excessive speeds, and the warning lights may also be used in this event on the dashboard of an automobile or in some other place directly visible to the driver or occupants.

I am aware that many changes may be made and numerous details of construction varied throughout a wide range without departing from the principles of this invention, and I therefore do not propose limiting the patent granted hereon otherwise than as necessitated by the prior art.

I claim as my invention:

1. A centrifugally operated switch for vehicles comprising a casing, a shaft rotatable in the casing, said shaft incorporated into the speedometer shaft of the vehicle, a pair of discs in the casing, one of said discs fixed to the shaft, a plurality of centrifugal governor balls pivotally mounted in slots in the disc, said pivotal mountings including bell crank levers, the ends of said bell crank levers contacting the underface of the second disc, said second disc slidably mounted on the shaft, a lever pivoted in the casing, a roller on one end of the lever adapted to ride on the upper face of said second disc, an electric contact element on the other end of said lever, a second electric contact element in the casing, a spring connected to the contact point carrying lever for normally holding the same in open circuit position.

2. A switch as described in claim 1, wherein the centrifugal governor balls, through their bell crank levers and disc and roller assembly, will close the current carrying points only when the speed of the vehicle drops below a predetermined minimum.

References Cited in the file of this patent

UNITED STATES PATENTS

| | | |
|---|---|---|
| 1,651,708 | Johansen | Dec. 6, 1927 |
| 2,096,069 | Seiden | Oct. 19, 1937 |
| 2,234,309 | Kromholz | Mar. 11, 1941 |
| 2,250,587 | Larson | July 29, 1941 |
| 2,275,695 | Stafford | Mar. 10, 1942 |